US008936325B2

(12) United States Patent
Sanlaville

(10) Patent No.: US 8,936,325 B2
(45) Date of Patent: Jan. 20, 2015

(54) AUDIO/VIDEO ELECTRONIC APPARATUS, IN PARTICULAR A MULTIMEDIA CAR RADIO, WITH A REMOVABLE FRONT PANEL

(71) Applicant: Parrot, Paris (FR)

(72) Inventor: Thierry Sanlaville, Paris (FR)

(73) Assignee: Parrot, Paris (FR)

( * ) Notice: Subject to any disclaimer, the term of this patent is extended or adjusted under 35 U.S.C. 154(b) by 50 days.

(21) Appl. No.: 13/706,080

(22) Filed: Dec. 5, 2012

(65) Prior Publication Data

US 2013/0175905 A1 Jul. 11, 2013

(30) Foreign Application Priority Data

Jan. 5, 2012 (FR) ...................................... 12 50116

(51) Int. Cl.
*A47B 81/06* (2006.01)
*B60R 11/02* (2006.01)
*H04B 1/08* (2006.01)

(52) U.S. Cl.
CPC ............ *B60R 11/0205* (2013.01); *H04B 1/082* (2013.01); *B60K 2350/405* (2013.01); *H04B 2001/084* (2013.01)
USPC ... 312/7.1; 312/319.1; 312/223.1; 312/265.6; 16/320

(58) Field of Classification Search
CPC ...... B60R 11/0205; H04B 1/08; H04B 1/082; H04B 1/088; B60K 2350/405; A47B 81/06; A47B 81/065; E05Y 2900/20; E05Y 2900/208; E05D 3/022
USPC .............. 312/7.2, 319.1, 223.1–223.2, 265.6; 16/320
See application file for complete search history.

(56) References Cited

U.S. PATENT DOCUMENTS

| 5,200,874 | A  | * | 4/1993  | Ito ................................. 361/627 |
| 5,610,376 | A  | * | 3/1997  | Takagi et al. .............. 200/50.01 |
| 5,953,302 | A  | * | 9/1999  | Kobayashi ..................... 720/647 |
| 2005/0194384 | A1 | * | 9/2005  | Petit ............................. 220/230 |
| 2005/0268433 | A1 | * | 12/2005 | Seidler .......................... 16/320 |
| 2006/0032989 | A1 | * | 2/2006  | Badiali ......................... 248/27.1 |
| 2006/0261600 | A1 | * | 11/2006 | Lee ............................... 292/175 |
| 2008/0158794 | A1 | * | 7/2008  | Watanabe et al. ............. 361/681 |
| 2008/0309098 | A1 | * | 12/2008 | Hsu et al. .................... 292/251.5 |

(Continued)

FOREIGN PATENT DOCUMENTS

| DE | 19825790 C1 | 6/2000 |
| EP | 1950094 A2 | 7/2008 |
| EP | 2184860 A1 | 5/2010 |

*Primary Examiner* — Darnell Jayne
*Assistant Examiner* — Ryan A Doyle
(74) *Attorney, Agent, or Firm* — Haverstock & Owens LLP

(57) ABSTRACT

The apparatus comprises: a case (100), in particular a case that can be integrated into a motor vehicle dashboard; a front panel element (200), removably mounted on the case; and means for the reversible assembly and fixation of the front panel element to the case. Such means include: at a first end of the front panel element and of the case, a dismountable magnetic hinge comprising a first pair of magnetic elements (124, 224), arranged on the case and on the front panel element, respectively, opposite to each other and in mutual attraction; and at an opposed, second end of the front panel element and of the case, means for locking the front panel element to the case, comprising a lock (212) and a second pair of magnetic elements (126, 226), arranged on the case and on the front panel element, respectively, opposite to each other and in mutual repulsion.

7 Claims, 4 Drawing Sheets

(56) References Cited

U.S. PATENT DOCUMENTS

| | | | |
|---|---|---|---|
| 2010/0109493 A1* | 5/2010 | Fargeau et al. | 312/7.1 |
| 2010/0161220 A1* | 6/2010 | Masuda et al. | 701/208 |
| 2011/0026203 A1* | 2/2011 | Ligtenberg et al. | 361/679.01 |
| 2011/0031766 A1* | 2/2011 | Huang et al. | 292/251.5 |
| 2011/0164388 A1* | 7/2011 | Ozaki | 361/725 |

* cited by examiner

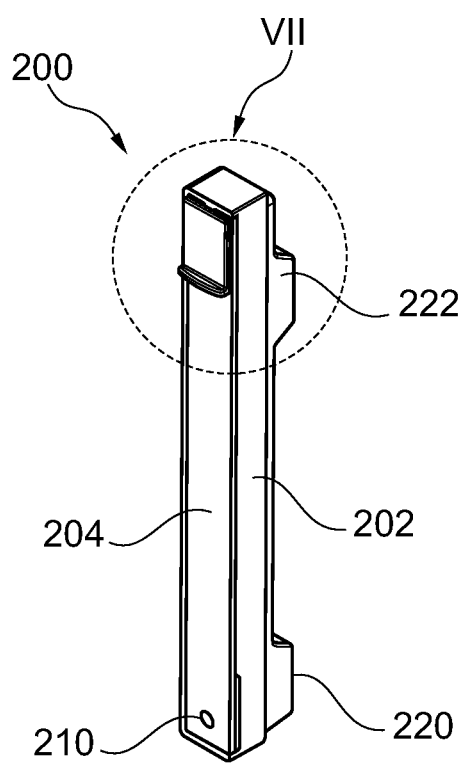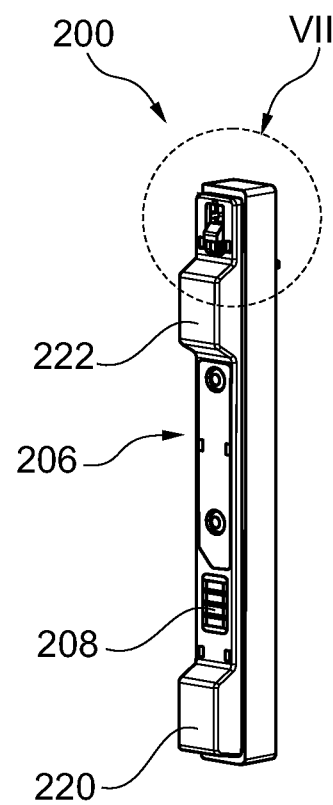
Fig. 5          Fig. 6
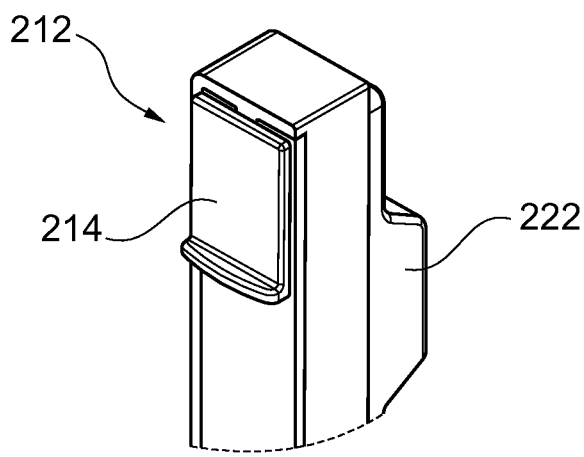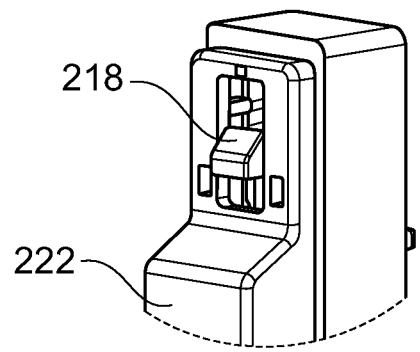
Fig. 7          Fig. 8

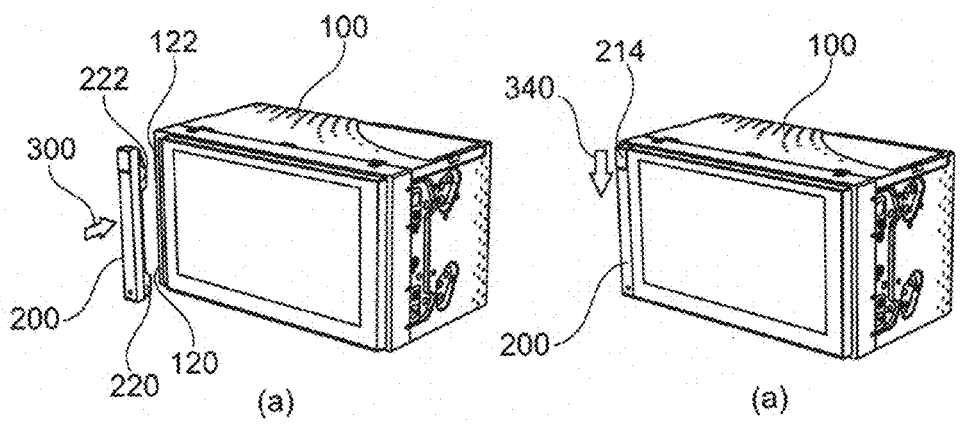
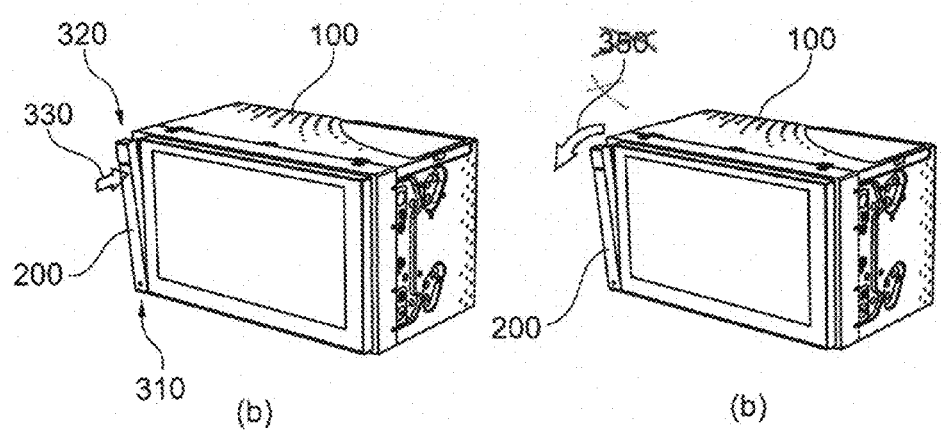
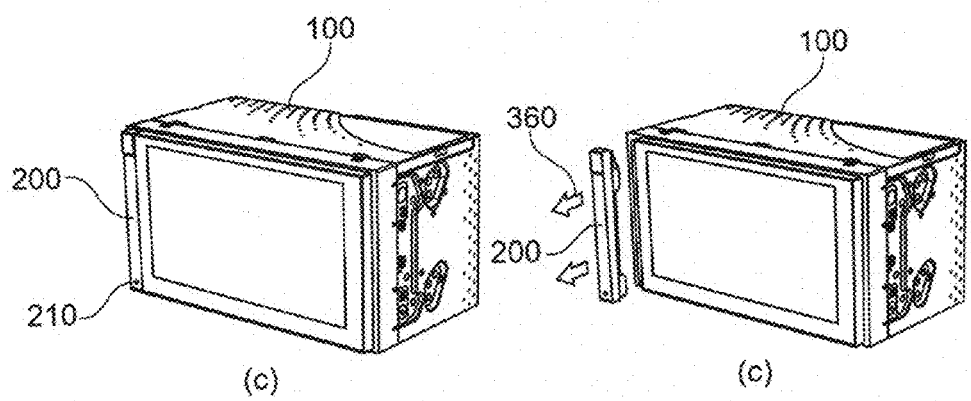
Fig. 9　　　　　　　　　　Fig. 10

AUDIO/VIDEO ELECTRONIC APPARATUS, IN PARTICULAR A MULTIMEDIA CAR RADIO, WITH A REMOVABLE FRONT PANEL

The present invention relates to the audio/video electronic apparatuses including a case provided with an element, such as a front panel, removably mounted on the case.

It more particularly relates to car radios, the case of which is permanently integrated into the dashboard of the motor vehicle, and which are provided with an anti-theft removable front panel, carrying in particular various control buttons allowing the car radio to be made operative when the front panel is fitted into the apparatus. The front panel may also allow a slot for insertion of a memory card, a compact disk, etc., to be cleared.

The application to car radios, if particularly advantageous, is however not limitative of the invention, which, as will be understood, may be applied to very much types of other electronic apparatuses.

The EP 2 184 860 A1 (Parrot) describes a car radio comprising a fully removable front panel. The EP 2 329 990 A1 (Parrot) describes another example of car radio with a partially removable front panel (side half front panel), corresponding to the model marketed under the name PARROT ASTEROID (registered trademark) by Parrot SA, Paris, France.

Generally, in the following of the description, the term "front panel" will be used to denote a fully removable front panel or only a removable front element that extends over only a more or less reduced fraction of the front surface of the apparatus.

The invention more particularly relates to the mounting/removal of a removable front panel.

The mounting of the front panel is done by putting it against the front wall of the case, then latch-locking it to the latter by means of a suitable system, for example a system with claws or hooks that can be released by pressing a button placed on the side of the front panel.

The front panel is generally made as a flap, with at one end a lock, generally a mechanical lock with a button or a tab controlling the claw or hook system, which allows the front panel to be disconnected and to be pivoted so that it can be grasped and removed. On the opposite side, the front panel is articulated to the case by a dismountable hinge, which may be either a hinge formed of purely mechanical parts that can be fitted into each other, or a magnetic hinge implementing a couple of magnets, mounted on the rear wall of the front panel and on the front wall of the case, and arranged opposite to each other and in mutual attraction so as to couple the front panel to the case with a pivoting degree of freedom. Such a dismountable magnetic hinge is described, for example, in the above-mentioned EP 2 184 860 A1.

However, the mounting of the front panel on the case sometimes requires some skill from the user, whereas, according to the place where the car radio is located on the dashboard, the handling conditions are not always ideal. Furthermore, it is important to correctly position the front panel at the time of mounting it, so that it can be correctly coupled to the case.

Finally, such a system must be robust enough so that it can tolerate faulty operations and mounting inaccuracies.

Generally, it is desirable that the removable front panel can be removed and mounted in the most ergonomic manner possible, with most simple mechanical means, avoiding the use of springs, ejection blades, etc.

To solve such problems, the invention proposes an apparatus of the type disclosed by the above-mentioned EP 2 184 860 A1, i.e. including: a case, in particular a case that can be integrated into a motor vehicle dashboard; a front panel element, removably mounted on the case; and mechanical means for the reversible assembly and fixation of the front panel element to the case. Such means include: at a first end of the front panel element and of the case, a dismountable magnetic hinge comprising a first pair of magnetic elements, arranged on the case and on the front panel element, respectively, opposite to each other and in mutual attraction; and at an opposed, second end of the front panel element and of the case, means for locking the front panel element to the case.

Characteristically of the invention, the means for locking the front panel element to the case comprise: a lock; and a second pair of magnetic elements, arranged on the case and on the front panel element, respectively, opposite to each other and in mutual repulsion.

In particular, the front panel element is mobile relative to the case between: a closed position, where the front panel element is held integral with the case by locking of the lock; a half-open position, where the front panel element is disconnected from the case on the lock side, after the latter has be unlocked, but remains coupled to the case on the magnetic hinge side, the magnetic elements of the first pair being placed side by side and the magnetic elements of the second pair being remote from each other; and a position of removal of the front panel element, where the latter is fully disconnected and uncoupled from the case, both on the lock side and on the magnetic hinge side.

The force of attraction of the magnetic elements of the first pair, the force of repulsion of the magnetic elements of the second pair, as well as the mass and arrangement of the front panel element are then chosen so that the half open position is a stable static position in the absence of external stress.

According to various advantageous subsidiary characteristics:
  the lock is a mechanical lock;
  the means for locking the front panel element to the case are devoid of an elastic component stressing the front panel element so as to move it away from the case;
  the front panel element is an element extending vertically with respect to the case of the apparatus, the first end being a lower end and the second end being an upper end;
  the front panel element is an element extending over a fraction of the front surface of the apparatus;
  the case accommodates a first electronic unit, the front panel element accommodates a second electronic unit connected to at least one command and control component visible on the front panel element, ant the apparatus further comprises an electric connector including cooperating components on the case and on the front panel element, to couple the first and second electronic units to each other, so that the apparatus is made functional only when the front panel element is mounted on the case;
  the apparatus further comprises, at the level of said first and/or second pair of magnetic elements, means for reciprocal guidance of the front panel element relative to the case, with in particular a boss formed on the front panel element and that can be fitted into a mating hollow shape formed in the case, or vice versa.

An exemplary embodiment of the device of the invention will now be described, with reference to the appended drawings in which same reference numbers designate identical or functionally similar elements throughout the figures.

FIG. 5 is a front perspective view of the removable front panel, dissociated from the case of the apparatus.

FIG. 6 is a rear perspective view of the removable front panel of FIG. 5.

FIG. 7 is an enlarged view of the detail denoted by VII in FIG. 5.

FIG. 8 is an enlarged view of the detail denoted by VIII in FIG. 6.

FIGS. 9a to 9c illustrate the successive steps of mounting the removable front panel on the case of the apparatus.

FIGS. 10a to 10c show the successive steps of removing the removable front panel from the apparatus.

Figure 1:
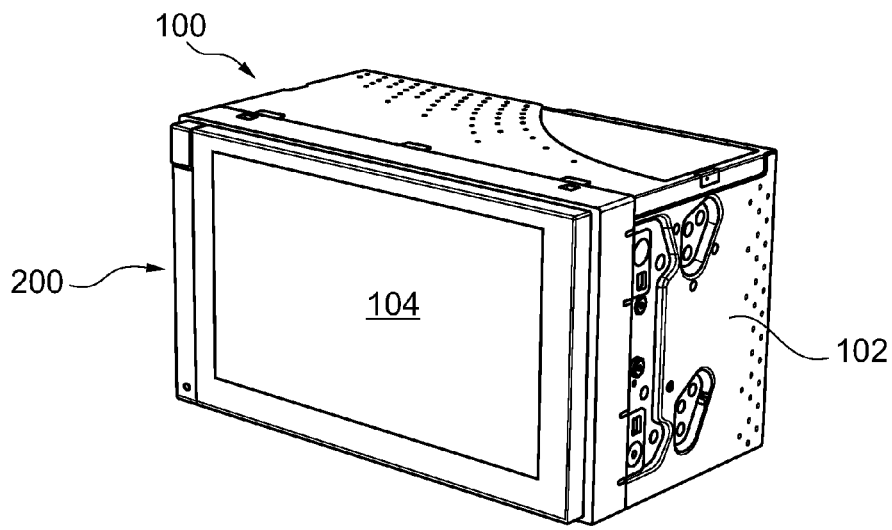
FIG. 1 is a general perspective view of an apparatus according to the invention, with the removable front panel mounted on the case.

The car radio according to the invention is for example, as illustrated in the figures, in the form of a block of standardized size that can be integrated into the dashboard of a motor vehicle. It is, for example, a standardized "double DIN" block (in reference to the standard DIN 75490/ISO 7736), corresponding to a size of opening of the dashboard accommodation of 180×100 mm.

The invention advantageously applies to a multimedia apparatus of the car radio type integrating hands-free phone functions and multimedia connectivity elements for the coupling of Walkman devices, memory cards storing audio files, Bluetooth stereo coupling with a wireless remote device, etc., as well as GPS satellite positioning functions.

This device includes, as illustrated in the figures, a case 100 comprising a box 102, enclosing the various electronic elements and normally integrated into the motor vehicle dashboard, with on the front side a fixed front panel element 104, for example a great-size touch display screen/panel for an easy control of the various functions as well as the display of lists, of a GPS card, etc.

This case 100 receives a removable front panel 200, which, in the example illustrated, is a removable front panel of reduced size extending as a vertical elongated element, placed laterally on the side of the fixed display screen 104 of the case 100.

Figure 3:
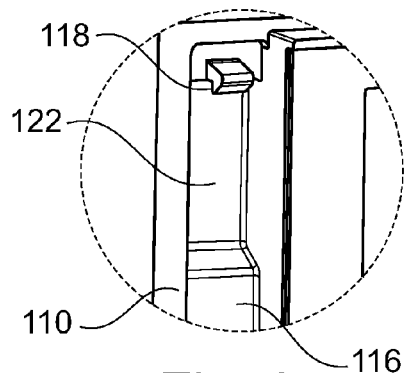
FIG. 3 is an enlarged view of the detail denoted by III in FIG. 2.
Figure 2:
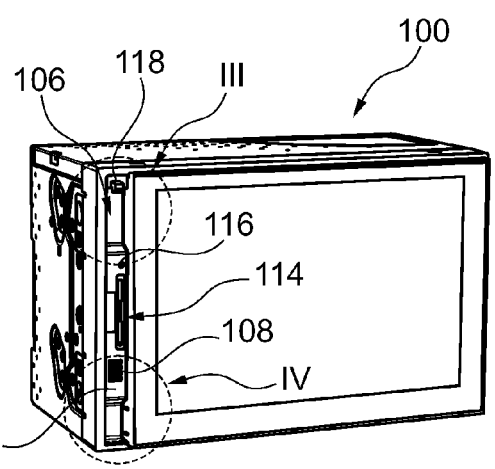
FIG. 2 is a perspective view of the same apparatus, with the removable front panel removed.
Figure 4:
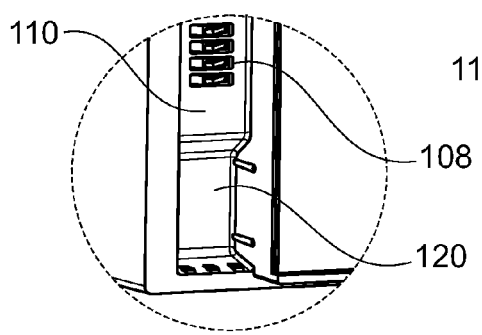
FIG. 4 is an enlarged view of the detail denoted by IV in FIG. 2.

As illustrated in FIGS. 2 to 4, where the case 100 has been shown with the removable front panel 200 removed, the case let appear in the cavity 106 cleared by the removal of the front panel various functional elements such as, for example, an electric connector 108 going through the front wall 110 of the case and connected to an electronic circuit 112 (FIG. 11) that is internal to the case.

The cavity 106 also includes an insertion slot 114 for a memory card, for example of the SD Card type, serving as a storage medium for music or data files, in particular cartographic data that can be used with a GPS navigation software product. The wall 110 of the cavity 106 also carries a reset button 116 for resetting, if need be, the internal software of the apparatus.

This list of functional elements is of course not limitative, and other elements may be contemplated, such as: rarely used control buttons (for the setting of some functions), insertion slot of a compact disk drive, trap for accommodating a Walkman, a mobile phone or a smartphone, etc.

The case also carries in the upper part thereof a fixed hook 118 for the locking of the front panel in the manner that will be exposed hereinafter, and the cavity 106 is configured so as to have in the lower and the upper parts thereof two recessed shapes 120 and 122 that will serve for guiding the front panel when the latter will be mounted, in the manner that will also be exposed hereinafter.

Figure 11:
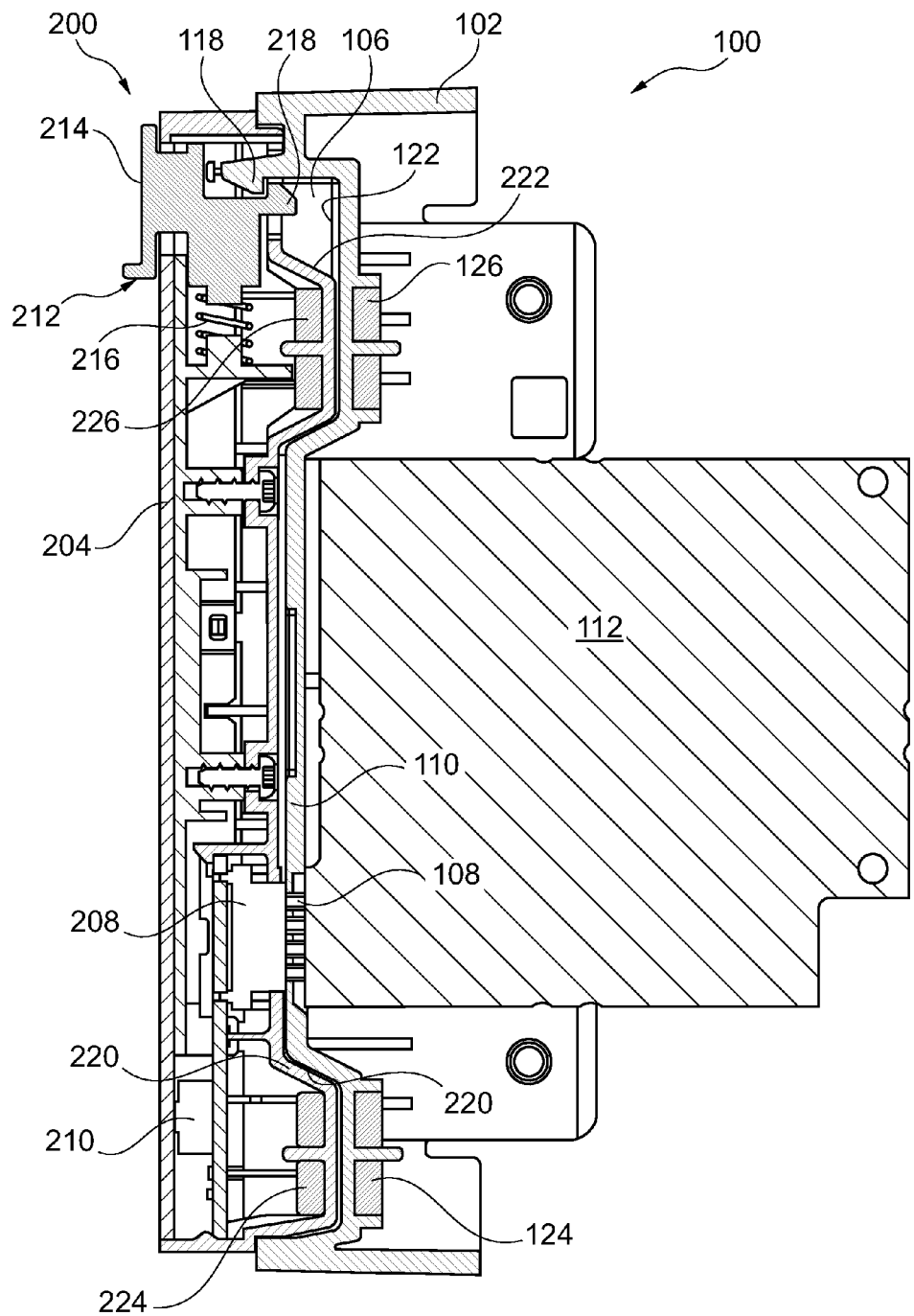
FIG. 11 is a cross section in elevation, taken in the median plane of the removable front panel, of this removable front panel mounted on the case of the apparatus.

The removable front panel 200, shown alone in FIGS. 5 to 8 and in cross section in FIG. 11, is in the form of a substantially parallelepiped-shaped, elongated bar, of same height as the fixed front display screen 104 of the case, so as to extend heightwise from the lower edge to the upper edge of the apparatus. The front panel 200 is made as a case 202 with front side 204 and a rear side 206. The rear side carries a connector element 208 intended to cooperate with the connector element 108 of the case 100 when the front panel is mounted on the latter. This connector element 208 is connected to internal circuits of the front panel 200, with in particular an "On/Off" button 210 present on the front side 204, to allow starting the apparatus by pressing this button after the front panel has been mounted on the case. The front panel may also comprise other elements such as indicator lights, etc., driven by voltages and signals applied by the case via the connector elements 108 and 208.

The removable front panel 200 plays a dual role. On the one hand, it blocks the access to the card slot 114 and to the system reset button 116, and on the other hand, it makes the apparatus inoperative when the front panel is removed: indeed, the electronic circuits of the case can be activated only by the switch 210 being pressed, which presuppose that the removable front panel 200 has been fitted into the accommodation 106 of the case 100 (anti-theft function).

In the upper part thereof, the removable front panel 200 includes a mechanical lock 212, comprising a tab 214 that is mobile against the force of a spring 216 (FIG. 11) to move downward a mobile hook 218 adapted to cooperate with the fixed hook 118 of the case to produce a positive mechanical lock between the front panel and the case when these two elements are brought together.

As a variant, the purely mechanical closing system with the two cooperating hooks 118, 218 may be replaced by a functionally equivalent system, for example an electrically releasable electromagnet closing system.

The removable front panel 200 further includes, respectively in the lower and the upper parts thereof, bosses 220, 222 that can be fitted into the mating hollow shapes 120 and 122 of the case, to ensure the natural guidance of the removable front panel when the latter is approached from the case to be secured to it.

In the lower part thereof, at the boss 220 and the hollow shape 120, the removable front panel and the case are, as illustrated in FIG. 11, coupled by a magnetic hinge comprising two respective magnets 224, 124, arranged opposite to each other and in mutual attraction, i.e. with the contrary poles turned toward each other. The magnets used are of a type that provides a sufficient attraction even when they are distant by a few millimeters, for example neodymium magnets that provide a very high force of attraction for a very small size.

The couple of magnets 124, 224 plays the role of two points of articulation for the case 100 and the front panel 200, without the need for adding any mechanical link part, the coupling of the front panel to the case at this place (in the lower region of the front panel) resulting only from the mutual attraction of the pair of opposite magnets.

As a variant, the pair of magnets 124, 224 may be replaced by a single magnet, provided in the case or in the front panel, associated with a passive ferromagnetic element provided in the front panel and in the case, respectively, for example a soft steel plate replacing one of the magnets.

In the upper part of the front panel and of the case, and characteristically of the invention, a pair of magnets 126, 226 is also provided, arranged opposite to each other on the case 100 and on the front panel 200, respectively, but these magnets are this time in relation of mutual repulsion, i.e. these are the poles of same name that are turned toward each other. The magnets 126, 226 may be, as the magnets 124, 224, neodymium magnets that provide a high repulsion force for a small size.

The principle of operation of the invention will now be described, with reference to FIG. 9 (mounting of the front panel) and FIG. 10 (removal of the front panel).

The particular configuration described above, with the two magnets 124, 224 attracting each other and the two magnets 126, 226 repelling each other, allows the front panel to be removed and mounted without guidance or accurate positioning; such configuration also allows the front panel to have a stable intermediate position during the mounting or removal phases.

More precisely, as illustrated in FIG. 9, to mount the removable front panel 200 on the case 100, the front panel is approached from the fitting area (Arrow 300, FIG. 9*a*), with the two bosses 220, 222 turned and approximately directed toward the mating hollow shapes 120 and 122 of the case.

As soon as the removable front panel is close enough from the fitting area, the two following actions then take place simultaneously:

the front panel is automatically put in position thanks to the lower magnetization area (attraction of the magnets 124, 224 of the magnetic hinge in the lower part 310), and the front panel remains slightly inclined relative to the plane of the front side 104 of the case, due to the repulsion of the two magnets 126, 226 in the upper part 320. The attraction/repulsion forces of the various magnets are chosen as a function of the mass of the removable front panel 200 so that the thus-reached intermediate position (FIG. 9*b*) is a stable static position in the absence of external stress.

The following step consists in exerting pressure (Arrow 330) on the upper part 320 of the removable front panel 200, which makes the latter pivot into its lower accommodation and locks it to the case of the apparatus.

The final configuration is that illustrated in FIG. 9*c*. It is therefore possible to start the apparatus by pressing the On/Off button 210. The removal of the front panel is done through the reverse operations, as illustrated in FIG. 10.

The first operation consists (Arrow 340, FIG. 10*a*) in lowering the sliding tab 214, to release the mobile hook 218 of the front panel from the fixed hook 118 of the case.

The front panel is then automatically ejected due to the repulsion of the magnets 126, 226 in the upper part 320. The front panel then takes the position illustrated in FIG. 10*b*, i.e. a position slightly inclined toward the user, such position being a stable position. The front panel may then be easily grasped by the user by its protruding part, and be extracted (Arrow 360, FIG. 10*c*) to be removed from its accommodation, which thus makes the apparatus inoperative (or clears the access to the card insertion slot).

Therefore, the system of the invention allows the removable front panel to be ejected by a very simple action of the user, using only one finger, and without the resort to a mechanical system such as an ejection spring or blade. The removable front panel can be mounted or got back in a very simple way, thanks to its stable intermediate position in which it is partially extracted and remains directed toward the user, which makes it easy to grasp.

The invention claimed is:

1. An audio/video electronic apparatus including:
   a case (100) for integration into a motor vehicle dashboard;
   a front panel element (200), removably mounted on the case; and
   a fixation mechanism that assembles and removably affixes the front panel element to the case, the fixation mechanism including:
      at first ends of the front panel element and of the case, a dismountable magnetic hinge comprising a first pair of magnetic elements (124, 224) having one of the first pair arranged on the case and another of the first pair arranged on the front panel element, such that the first pair are opposite to each other and in mutual attraction; and
      at second ends of the front panel element and of the case that are opposed to the first ends, a locking mechanism having a structure that locks the front panel element to the case,
   characterized in that the locking mechanism comprises:
      a lock (212), wherein the lock (212) is a mechanical lock (214, 216, 218) having a first lock element arranged on the case and a second lock element arranged on the front panel element, wherein the first lock element and the second lock element fit together to releasably lock the front panel element to the case; and
      a second pair of magnetic elements (126, 226) positioned separate from the lock, having one of the second pair arranged on the case and another of the second pair arranged on the front panel element such that the second pair are opposite to each other and in mutual repulsion;
   wherein the front panel element is mobile relative to the case between:
      a closed position, where the front panel element is secured to the case by locking of the lock;
      a half-open position, where the front panel element is disconnected from the case at the second ends after the locking mechanism has been unlocked, but remains coupled to the case at the first ends such that the magnetic elements of the first pair are side by side and the magnetic elements of the second pair are remote from each other; and
      a position of removal of the front panel element, where the front panel element is fully disconnected and uncoupled from the case on both the first ends and the second ends;
      and further wherein a force of I attraction of the magnetic elements of the first pair, a force of repulsion of the magnetic elements of the second pair, as well as a mass and arrangement of the front panel element are chosen so that the half-open position is a stable static position in absence of external stress.

2. The apparatus according to claim 1, wherein the locking mechanism is devoid of an elastic component stressing the front panel element so as to move the front panel element away from the case.

3. The apparatus according to claim 1, wherein the front panel element extends vertically with respect to the case of the apparatus, and wherein said first end is a lower end and said second end is an upper end.

4. The apparatus according to claim 1, wherein the front panel element extends over a fraction of the front surface of the apparatus.

5. The apparatus according to claim 1, wherein:
the case accommodates a first electronic unit (112),
the front panel element accommodates a second electronic unit coupled to at least one command and control component (210) visible on the front panel element, and
the apparatus further comprises an electric connector including cooperating components (108, 208) on the case and on the front panel element, to couple said first and second electronic units to each other, so that the apparatus is made functional only when the front panel element is mounted on the case.

6. The apparatus according to claim 1, further comprising, adjacent to one or both of said first and second pair of magnetic elements, a guidance mechanism having guidance structure (120, 220; 122; 222) configured to provide reciprocal guidance of the front panel element relative to the case.

7. The apparatus according to claim 6, wherein the guidance mechanism comprises a boss (220; 222) formed on the front panel element and that can be fitted into a mating hollow shape (120; 122) formed in the case, or vice versa.

\* \* \* \* \*